United States Patent
Kaiser et al.

(10) Patent No.: US 6,932,731 B2
(45) Date of Patent: Aug. 23, 2005

(54) TENSIONER

(75) Inventors: Jörg Kaiser, Lonnerstadt (DE); Herbert Graf, Bischberg (DE)

(73) Assignee: INA-Schaeffler KG, Herzogenaurach (DE)

( * ) Notice: Subject to any disclaimer, the term of this patent is extended or adjusted under 35 U.S.C. 154(b) by 210 days.

(21) Appl. No.: 10/189,165

(22) Filed: Jul. 3, 2002

(65) Prior Publication Data

US 2003/0017894 A1 Jan. 23, 2003

Related U.S. Application Data

(60) Provisional application No. 60/303,326, filed on Jul. 5, 2001.

(51) Int. Cl.$^7$ .............................. F16H 7/08; F16H 7/12
(52) U.S. Cl. ...................................... 474/135; 474/112
(58) Field of Search ................................ 474/135, 112, 474/109–110, 117

(56) References Cited

U.S. PATENT DOCUMENTS

| 4,832,665 | A | * | 5/1989 | Kadota et al. .............. 474/112 |
| 5,244,438 | A | * | 9/1993 | Golovatai-Schmidt ...... 474/112 |
| 5,620,385 | A | * | 4/1997 | Cascionale et al. ......... 474/112 |
| 5,647,813 | A | * | 7/1997 | Serkh ......................... 474/135 |
| 5,702,317 | A | * | 12/1997 | Kawashima et al. ........ 474/110 |
| 5,772,549 | A | * | 6/1998 | Berndt et al. ............... 474/112 |
| 6,592,482 | B2 | * | 7/2003 | Serkh ......................... 474/135 |
| 6,659,896 | B1 | * | 12/2003 | Stief et al. .................. 474/135 |

FOREIGN PATENT DOCUMENTS

| DE | 40 15 028 A1 | | 1/1992 | |
| EP | 0636815 A1 | * | 2/1995 | ............... 474/135 |
| JP | 08-61446 A | * | 3/1996 | ............... F16H/7/12 |
| JP | 11-37234 A | * | 2/1999 | ............... F16H/7/12 |
| JP | 11-201247 A | * | 7/1999 | ............... F16H/7/12 |

* cited by examiner

Primary Examiner—Marcus Charles
(74) Attorney, Agent, or Firm—Henry M. Feiereisen

(57) ABSTRACT

A tensioner for a traction member includes a faceplate that is stationarily secured to a machine part, with a working eccentric member rotatably supported on the faceplate for limited rotation against a spring force. After pre-installation of the tensioner, a locking device fixes the position of the working eccentric member relative to the faceplate. In one installation position, a catch limits the pivot range of the working eccentric member.

13 Claims, 4 Drawing Sheets

TENSIONER

CROSS-REFERENCES TO RELATED APPLICATIONS

This application claims the benefit of prior filed provisional application, Application Ser. No. 60/303,326, filed Jul. 5, 2001, pursuant to 35 U.S.C. 119(e), the subject matter of which is incorporated herein by reference.

BACKGROUND OF THE INVENTION

The present invention relates to a tensioner for traction members, in particular belts, for a traction drive.

Tensioners of this type are used for a traction drive for power units or control belts of an internal combustion engines. The tensioner has a faceplate that is affixed stationarily to a machine part, for example the housing of an internal combustion engine, to which a support body is affixed in fixed rotative engagement. The support body is adapted to receive a working eccentric member that can be rotated against a spring force. A tensioning roller is associated with the working eccentric member and supported on the traction member.

U.S. Pat. No. 4,832,665 describes a tensioner with a tensioning roller supported on an eccentric member by a roller bearing. The eccentric member is swingably supported on a support body which is attached to a machine part, e.g., a motor housing, by a bolt fastener. A helical spring surrounding the eccentric member is supported with one end on the machine part and with the other end on the eccentric member in such a way that the eccentric member with the tensioning roller is resiliently urged against the traction member, such as a belt. The tensioner includes a safety pin which holds the tensioning spring in pre-tensioned disposition before the unit is operated for the first time. After the tensioner is flanged onto the machine part, e.g., the internal combustion engine, the safety pin is removed, causing the eccentric member to be resiliently urged against the traction member by the force of the tensioning spring.

German Pat. No. DE 40 15 028 A1 shows a tensioner that includes an adjustment eccentric member and a working eccentric member. During assembly of the internal combustion engine, the tensioner is initially loosely secured with a bolt which is guided through an eccentric attachment bore. The tensioner is pivoted against the traction member with an adjustment tool that is inserted into a hexagon socket. During tensioning operation, the traction member exerts a reaction force onto the tensioner. When pivoted further, the helical spring that is inserted in the tensioner, is tensioned and the mounting element pivots. The pivoting operation continues until two notches disposed on the flange and on a plastic disk overlap. In this position, a projection is located in a recess within the pivot range of the tensioning arm. The bolt is then tightened in this initial position. Difficulties can arise when for the initial adjustment the adjustment eccentric member of the tensioner that has the two eccentric members is rotated to a point where the notches no longer overlap. When the adjustment eccentric member is subsequently rotated in the reverse direction, until the two notches are aligned with one another, the projection is no longer located in the center of the recess, but has an offset thereto. This effect is caused by a hysteresis effect due to the internal friction between the machine parts during the initial adjustment. In this case, the limit stop that is formed by the projection and the recess is in a different position which directly affects the pivot range of the tensioning arm. The altered pivot range adversely affects the run forces of the traction member which then deviate from the predetermined values.

It would therefore be desirable and advantageous to provide an improved tensioner which obviated prior art shortcomings and has a simple construction to ensures a precise, reproducible mounting position for obtaining same running forces in the traction member.

SUMMARY OF THE INVENTION

According to one aspect of the present invention, a tensioner includes a locking mechanism which has a fixed position with respect to the faceplate after the initial installation of the working eccentric member. This approach simplifies the handling and installation of the tensioner and the traction member, since the working eccentric member assumes hereby a position that corresponds to the un-tensioned traction member. The tensioner according to the invention further includes a catch which limits the pivot range or adjustment angle of the working cylinder relative to the faceplate. The catch which becomes active after the release of the locking device affects the degree of freedom, preventing an impermissible pivot range of the working cylinder. The catch is dimensioned so that the working eccentric member can assume all positions under normal operation of the traction member, while simultaneously preventing extreme excursions of the working eccentric member. A traction member formed as a toothed belt is thereby effectively prevented from skipping a tooth, which can result in severe consequences, for example, changing control times of the gas exchange valves of an internal combustion engine.

The tensioner according to the invention includes a faceplate, which is stationarily affixed on a machine part, primarily a housing of the internal combustion engine, when the tensioner is installed. This prevents a change in position or a subsequent rotation of the entire tensioner, when the attachment device is screwed in. At the same time, this design provides a precise and always reproducible installation position of the tensioner relative to the machine part. The tensioner according to the invention is therefore suited for automatic assembly, because the articulation points and support points of the tensioner are precisely defined. The invention advantageously guarantees that the traction member is pre-tensioned in substantial agreement with a predetermined tension of the traction member, thereby increasing the reliability of the entire traction drive. The simple construction of the tensioner according to the invention in conjunction with a simplified assembly process provides significant cost advantages. In addition, only minor changes to the tensioner according to the invention are required to mate with the contact and/or support surface of the machine part, in particular the housing of an internal combustion engine, produced in series.

According to another feature of the present invention, the catch may effectively be implemented to define the adjustment range of the working eccentric member, by a spring-biased pin, a retainer button or pushbutton, which interlocks with an oblong hole of the corresponding additional component, when their position overlaps. The spring-biased pin is constructed so as to automatically and form-fittingly engage the oblong hole after the locking device is released. The retainer button, pin or pushbutton is designed so as not to influence the operating range or the operation of the working eccentric member, and is hence guided in the oblong hole with play. The catch is hence only provided for preventing extreme positions of the working eccentric member which can, as described above, have an adverse effect on the operation of the traction member and the equipment connected thereto.

The arcuate oblong hole which cooperates with the spring-biased pin or pushbutton to form the catch, extends over an angle that exceeds a maximum adjustment range of the working eccentric member during normal operation. In this way, the catch prevents potentially harmful extreme positions of the working eccentric member.

According to another feature of the present invention, the catch may be so arranged that the retention pin is associated with the working eccentric member and the oblong hole is associated with the faceplate. Alternatively, the invention may also include the reverse arrangement with an oblong hole disposed in the working eccentric member and a pin that is guided in the hole and has a fixed position on the faceplate.

According to another feature of the present invention, the locking device may include a retention pin which is inserted in a recess or bore of a flange arranged radially on the outer surface of the working cylinder and which after the initial installation of the tensioner interlocks with a corresponding bore in the faceplate. Handling of the retention pin is facilitated by dimensioning its length greater than a width of the entire tensioner and angling an end and/or providing the end with an eyelet.

To dampen the actuating motion of the tensioning roller, the working eccentric member of the tensioner may be provided with a damping device, which is arranged between the working eccentric member and a support disk that is non-rotatably connected with the support body. Alternatively, the sliding bearing bushing inserted in an annual gap disposed between the working eccentric member and the support body can be formed as a multi-function part. The sliding bearing bushing is hereby provided with an integrally formed collar extending around its periphery, which in the installed position is inserted between the front face of the working eccentric member and the support disk that has a fixed position relative to the support body. An axial force component of the torsion spring is applied to the friction disk. The torsion spring that is inserted between the faceplate and the working eccentric member is also provided to hold the tensioning roller in forced engagement against the traction member by applying a circumferential force for the purpose of achieving a sufficient pretension.

Alternatively or in addition, according to another feature of the present invention, there may be provided a damping device, which includes a friction element disposed between the working eccentric member and the faceplate. The friction element is preferably inserted in an annular gap that is bounded radially by the working eccentric member and the support body. A defined friction force of the friction element is obtained by a compression spring that is also inserted in the annular gap and presses the friction element in forced engagement in an axial direction against a friction surface of the faceplate. The damping devices according to the invention can be employed separately or together to affect the operation of the working eccentric member and to at least partially compensate and/or dampen the uneven rotation speed caused by the internal combustion engine and transmitted to the traction member via the crankshaft and the connected pulley. In this way, the tensioner according to the invention improves the service life of the traction member and optimizes the noise performance of the traction drive, as a result of decreased oscillation amplitudes and a reduced oscillation frequency of the traction member.

The damping performance can be optimized by selecting an appropriate material for the friction element, in particular plastic or an organic material, in conjunction with a matching spring force. The choice of friction radii also influences the damping characteristic.

According to another feature of the present invention, there may be provided a guide disk, which supports a spring end of the torsion spring on the faceplate of the tensioner. The guide disk includes an axially oriented sleeve portion for guiding and end portion of the torsion spring, thereby preventing the spring coils from contacting the working eccentric member to establish a controlled spring moment. On the side facing away from the sleeve portion, the guide disk forms at least one centering flash, which is positively fitted and thus non-rotatably installed in a recess of the faceplate. In addition, the guide disk is provided with a ramp for support of a spring end of the torsion spring. The guide disk may be positioned with play relative to the working eccentric member independent of its position, to thereby prevent uncontrolled and potentially harmful friction between these components.

A tensioner according to the invention is especially suitable to facilitate an assembly process, as described in detail below. The tensioner provided for this process has a configuration with the following components and/or features:

A faceplate provided with a centering shoulder and an oblong hole to form together with a support body form a single-piece unit; a bolt fastener extending through a center bore of the support body and used to stationarily secure the tensioner to a machine part; a working eccentric member which is supported for limited rotation on the support body and is surrounded on its outside by a tensioning roller; a damping device which is arranged between a non-rotatable component of the tensioner and the working eccentric member; and a locking device and a catch disposed between the working eccentric member and the faceplate.

According to another aspect of the present invention, a tensioner according to the present invention is installed by a process which includes the steps of: securing the support body to the faceplate and then pushing the working eccentric member together with the tensioning roller, the torsion spring, the sliding bearing and the locking device onto the support body in an axial direction, thereby pretensioning the torsion spring. Thereafter, a locking washer is secured to one end of the support bolt, with the working eccentric member directly or indirectly axially supported on the support bolt. After rotating the working eccentric member relative to the faceplate, against the force of the torsion spring to a pre-installation position, the working eccentric member is locked relative to the faceplate with a retention pin. For the final installation of the tensioner according to the invention on a machine part and/or the housing of an internal combustion engine, the faceplate with the centering shoulder is first inserted in a corresponding recess of the machine part before being secured with a screw that is inserted in the center of the support body. A catch is automatically activated after the retention pin is released and the working cylinder is pivoted from the pre-installation position to the operating position. The catch is preferably implemented as a spring-biased retention pin which is integrated in the working cylinder and engages an oblong hole in the faceplate in form-fitting manner, to thereby limit an adjustment range of the working eccentric member relative to the faceplate. Before the retention pin of the locking device is released, the traction member is placed on the pulleys of the traction drive, so that the traction member is automatically pretensioned when the working eccentric member pivots.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
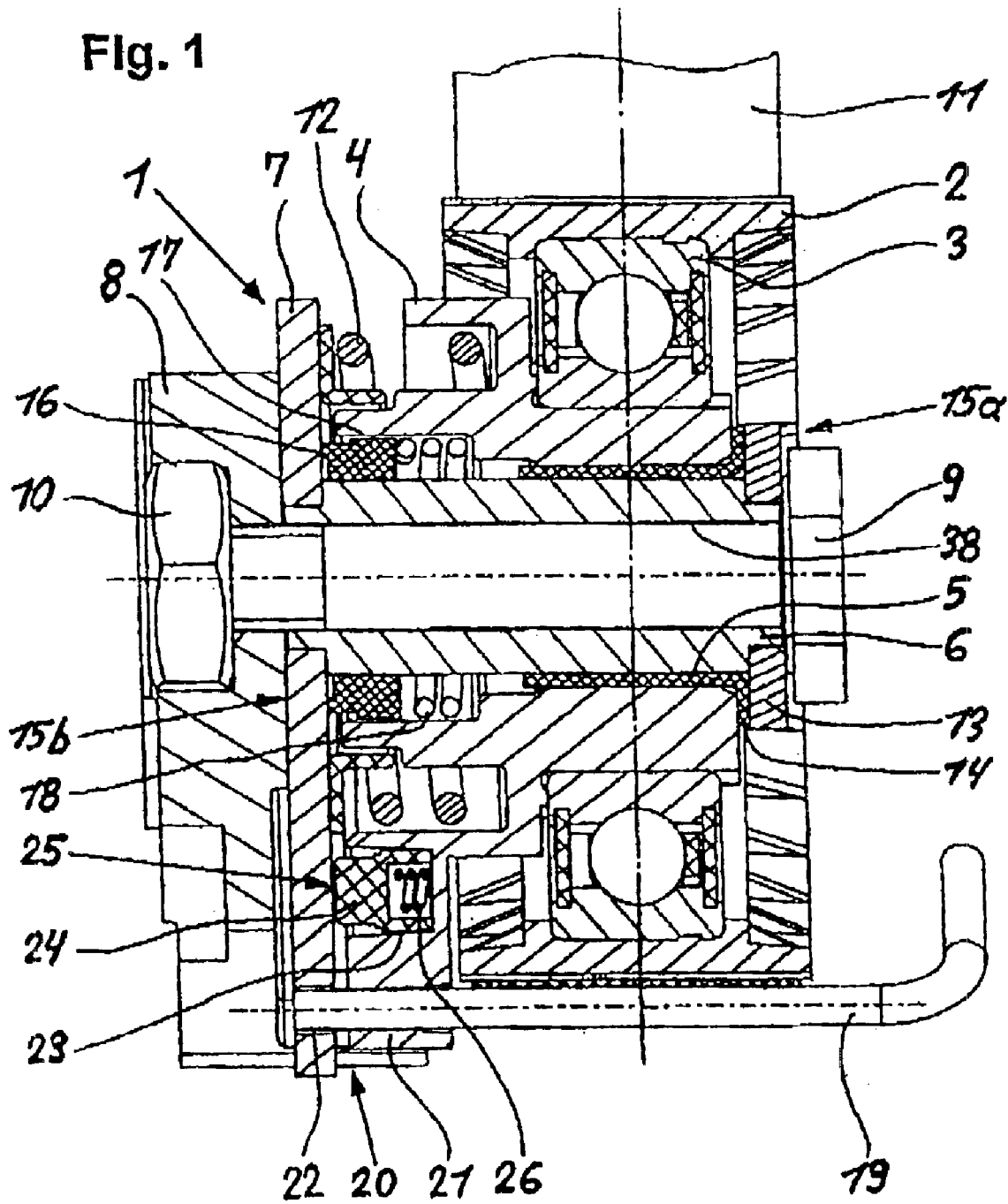
FIG. 1 is a longitudinal section of a tensioner according to the present invention.

Throughout all the Figures, same or corresponding elements are generally indicated by same reference numerals. Embodiments and modifications thereof as described in the figures are to be understood only as exemplary and in no way as limiting the scope of the invention.

Turning now to the drawing, and in particular to FIG. 1, there is shown a longitudinal section of a tensioner according to the present invention, generally designed by reference numeral 1 includes a tensioning roller 2 supported by a roller bearing 3 disposed on the outside of a working eccentric member 4. The working eccentric member 4 is supported for rotation on a support body 6 by a sliding bearing 5, wherein the support body 6 is affixed to a faceplate 7 and forms a subassembly. The faceplate 7 can be attached to a machine part 8 and prevents the entire tensioner 1 from rotating relative to the machine part 8, which is preferably a housing of an internal combustion engine (not shown in FIG. 1). The tensioner 1 can be attached to the support body 6 with a bolt fastener 9 that is inserted in a center bore 38. The bolt fastener 9 is directly screwed into the machine part 8 or into a separate threaded nut 10.

The tensioning roller 2 can be held in forced engagement with a traction member 11 by placing a torsion spring 12 between the faceplate 7 and the working eccentric member 4. The torsion spring 12 not only applies a circumferential force to the tensioning roller 2, but also an axial force which is applied to the working eccentric member 4 in a direction other than towards the faceplate 7. The axial force is supported by a locking washer 13 disposed on an end of the support body 6, whereby the working eccentric member 4 is not supported directly on the locking washer, but on a collar 14 which is connected in single-piece construction with the sliding bearing 4 and forms a damping device 15a. In an alternative embodiment, instead of the single-piece construction of the collar 14 with the sliding bearing 5, the damping device 15a may also be implemented by inserting a separate friction disk between the working eccentric member 4 and the locking washer 13.

The tensioner 1 is provided with a further damping device 15b, which includes a friction element 16 that is inserted in an annular gap 17 radially bounded by the support body 6 and a stepped interior wall of the working eccentric member 4. The friction element 16 is pressed against the faceplate 7 by a helical compression spring 18 and reduces or dampens the pivot movements of the working eccentric member 4 and compensates or prevents disadvantageous oscillations. This has an advantageous effect on the excitation of oscillations in the traction member 11 and thereby on the noise generation of the entire traction drive.

Figure 1A:
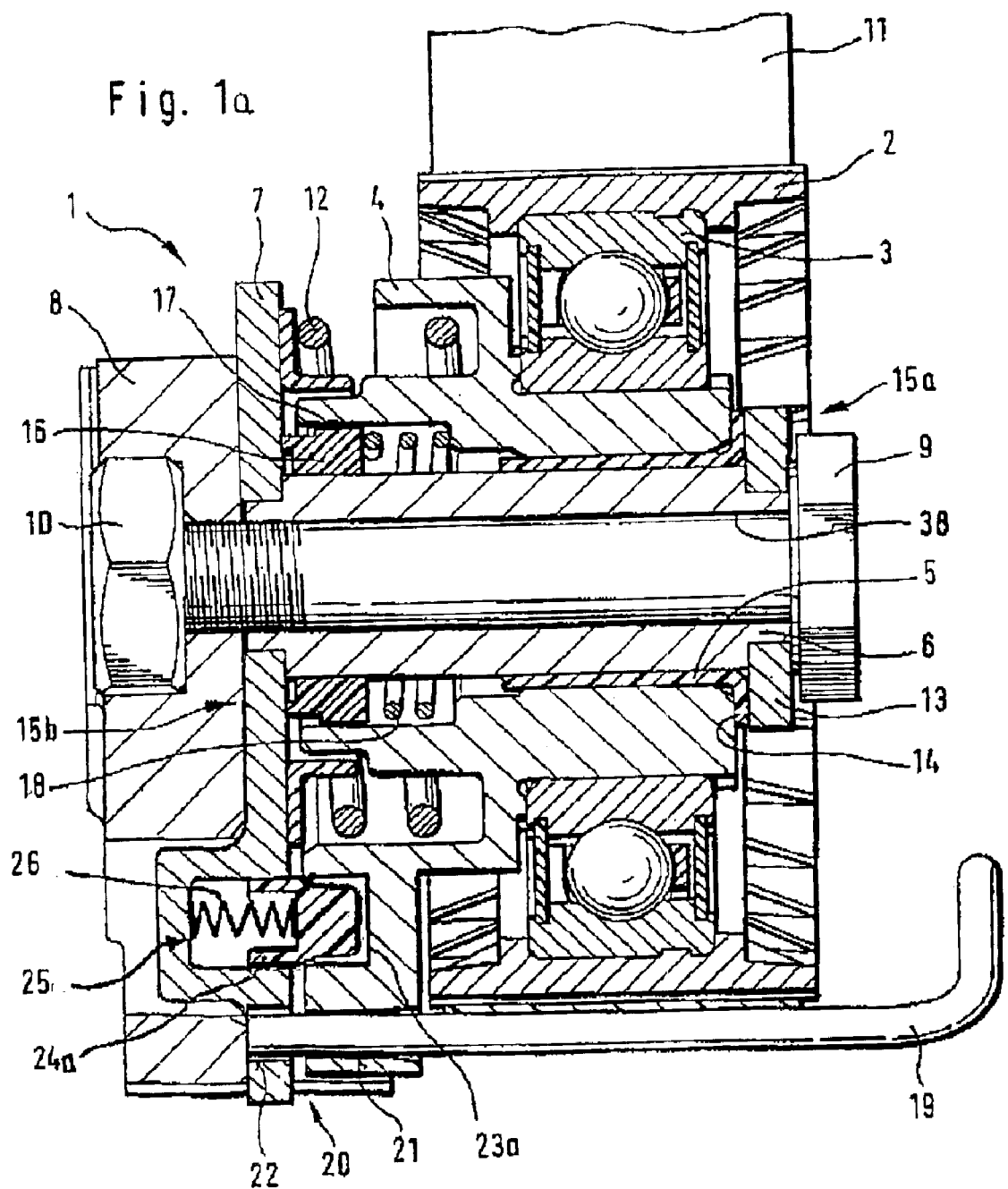
FIG. 1a is a longitudinal section of a modified tensioner according to the present invention.

As further shown in FIG. 1, there is also provided a locking device 20, which can be used to facilitate the installation by locking the working eccentric member 4 after the pre-installation phase relative to the faceplate 7 with a retention pin 19, when the positions of respective bores 21, 22 in the working eccentric member 4 and the faceplate 7 overlap. The tensioner 1 also includes a catch 25, which in the installed position of the tensioner 1, limits a pivot range or degree of freedom of the working eccentric member 4 relative to the faceplate 7. For this purpose, a pin 24 is provided which is placed off-center in a blind hole 23 in the working eccentric member 4. A compression spring 26 is associated with the pin 24 and together form a pushbutton which is displaced in an axial direction when its position overlap with an oblong hole 27 of the faceplate 7 depicted in FIG. 4. A radian measure of the oblong hole, the angle "α", defines the maximum adjustment range of the working eccentric member 4. Alternatively, as shown in FIG. 1a, the tensioner 1 may also include the reverse arrangement of a catch 25, whereby an oblong hole 23a is disposed in the working eccentric member 4 and a pin 24a is guided in the hole 23a and has a fixed position on the faceplate 7.

Figure 2:
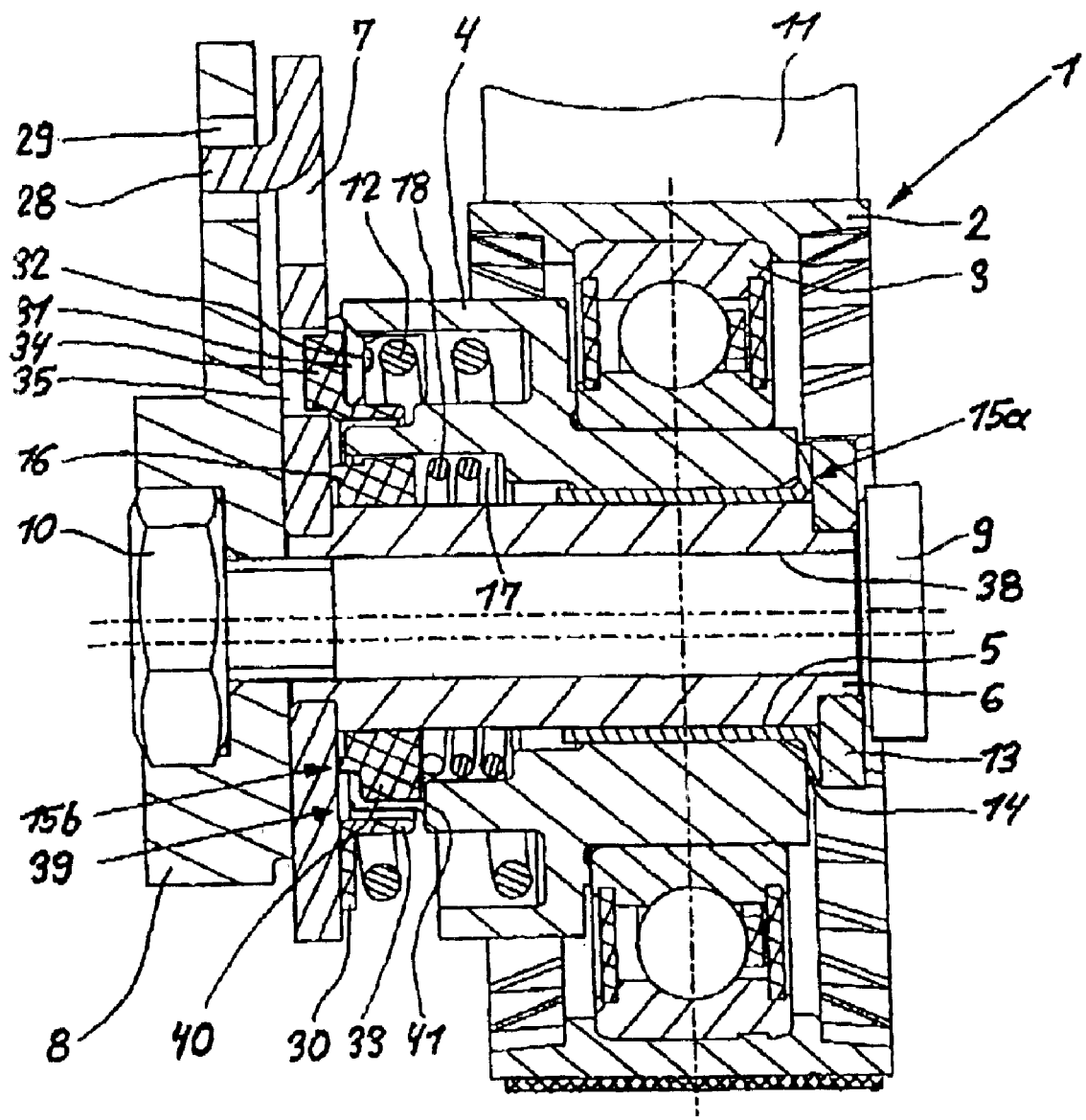
FIG. 2 is a further longitudinal section of the tensioner of FIG. 1.
Figure 3:
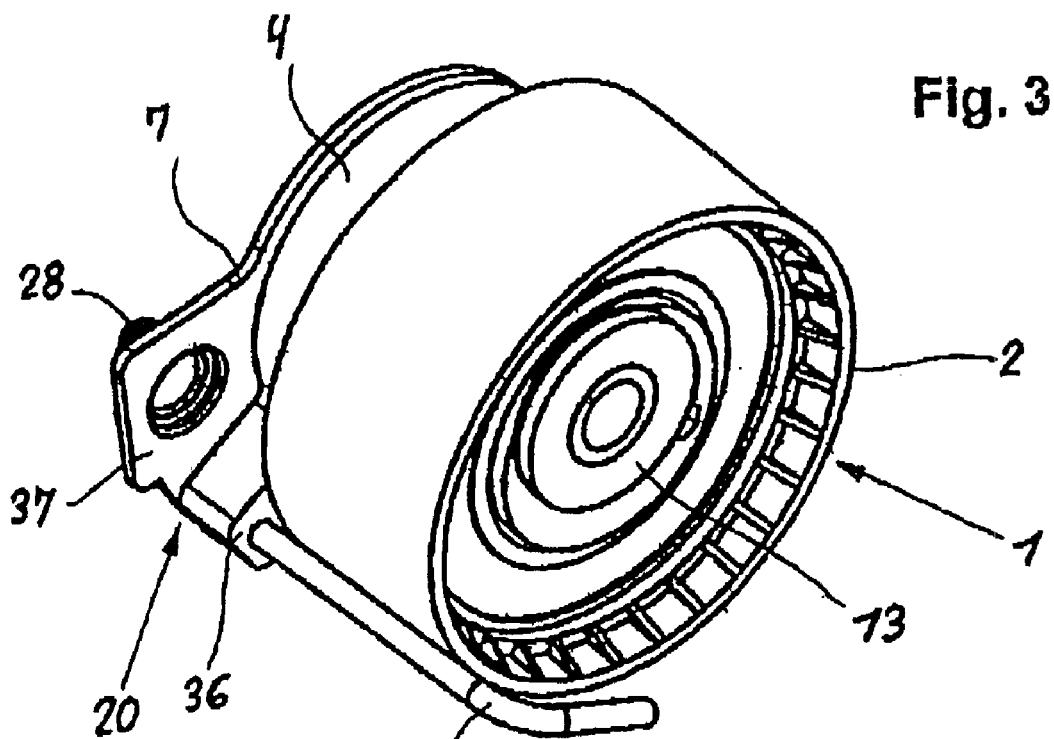
FIG. 3 is a perspective view of the tensioner of FIGS. 1 and 2, as viewed in a direction of the tensioning roller.
Figure 4:
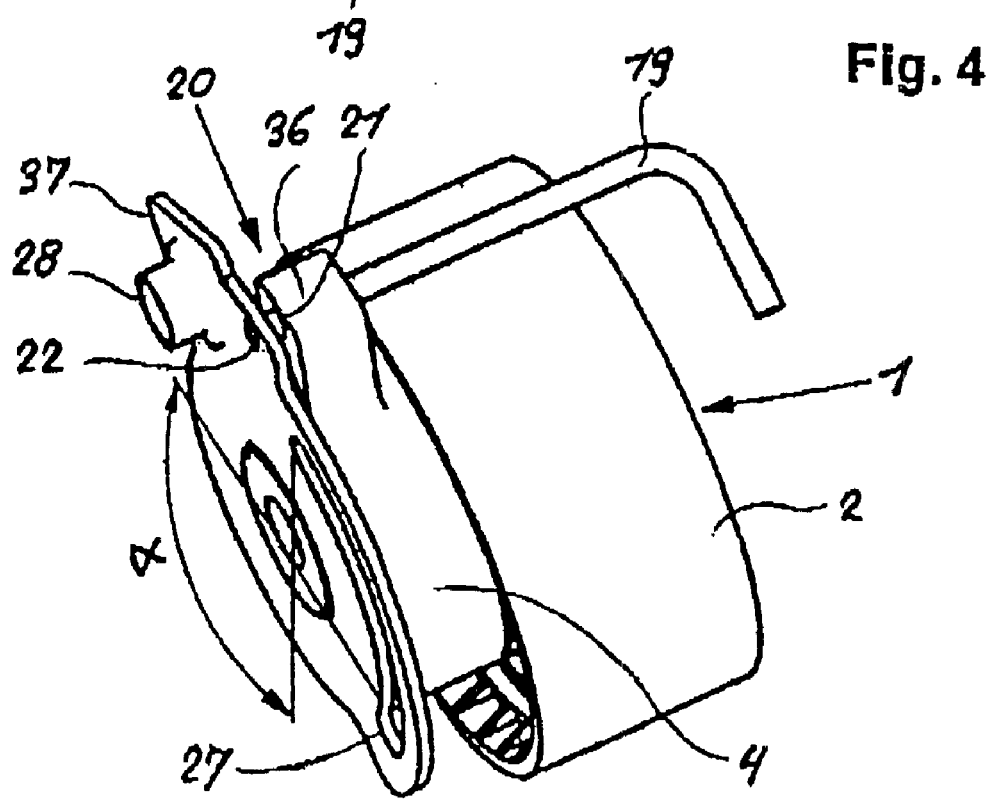
FIG. 4 is a perspective view of the tensioner, as viewed in the direction of the faceplate.

Referring now to FIGS. 2 to 4, there are shown an additional sectional view and two perspective views of the tensioner 1. Parts corresponding with those in FIG. 1 are denoted by identical reference numerals and not explained again.

As shown in FIG. 2, the faceplate 7 is arranged in a fixed position on the machine part 8 by means of a centering shoulder 28 which is fitted in a recess 29 of the machine part 8. A guide disk 30 non-rotatably supports the torsion spring 12 on the faceplate 7. The guide disk 30 has a ramp 31 for support of a spring end 32 of the torsion spring 12. A sleeve portion 33 of the guide disk 30 extending inside the torsion spring 12 prevents the torsion spring 12 from contacting the working eccentric member 4 which could adversely affect the friction moment. The guide disk 30 further includes at least one centering flash 34 which engages a bore 35 of the faceplate 7 in a form-fitting manner, thereby effectively inhibiting rotation. FIG. 2 furthermore shows a rotation inhibiting element 39 disposed between the friction element 16 and the working eccentric member 4. The friction element 16 is hereby provided with a radial shoulder 40 which form-fittingly engages in a slotted recess 41 of the working eccentric member 4.

FIGS. 3 and 4 show different perspective views of the tensioner 1 to more particularly illustrate the arrangement of the locking device 20. For guiding the retention pin 19, the working eccentric member 4 is at one location provided with a radially extending flash 36, which is formed with the bore 21. The bore 22 cooperates with the bore 21 of the working eccentric member 4 and is provided in a radially outwardly extending shoulder 37 of the faceplate 7. The centering shoulder 28 of the faceplate 7 is also located in the region of the shoulder 37. The oblong hole 27 is implemented in the faceplate 7 as a circular arc profile, with the pin 24 depicted in FIG. 1 in the installed position of the tensioner 1 and in the working position form-fittingly engaging in the oblong hole 27 to form the catch 25. The oblong hole 27 extends over an angle "α" which exceeds the typical operating or pivot range of the working eccentric member 4. The pin 24 and the catch 25 perform their respective locking function only when the permissible operating range of the working eccentric member 4 is exceeded.

While the invention has been illustrated and described as embodied in a tensioner, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents.

What is claimed is:

1. A tensioner for a traction member, comprising:
a faceplate stationarily affixed on a machine part;
a support body non-rotatably secured to the faceplate;
a torsion spring supported on the support body;
a working eccentric member connected with the traction member and supported in encompassing disposition on the support body for limited rotation against a spring force of the torsion spring;
a tensioning roller concentrically supported for rotation on the working eccentric member by a bearing that encompasses the support body;
at least one damping device disposed between the working eccentric member and a non-rotatable component of the tensioner; and
a locking device and a catch, wherein the locking device fixes a position of the working eccentric member relative to the faceplate after an initial installation of the tensioner, and the catch limits a pivot range of the working eccentric member relative to the faceplate in an installed position of the tensioner,
wherein one of the working eccentric member and the faceplate has a spring-biased pin and the other of the faceplate and the working eccentric member has an oblong hole, said pin forming the catch which interlocks with the oblong hole when the positions of the pin and the oblong hole overlap.

2. The tensioner of claim 1, wherein the oblong hole is formed as a circular arc that extends at an angle which exceeds at least one of a maximum pivot range and an adjustment range of the working eccentric member during normal operation.

3. The tensioner of claim 1, wherein the catch is formed by disposing the spring-biased pin on the working eccentric member and by disposing the oblong hole on the faceplate.

4. The tensioner of claim 1, wherein the catch is formed by disposing the spring-biased pin on the faceplate and by disposing the oblong hole on the working eccentric member.

5. The tensioner of claim 1, wherein the locking device comprises a retention pin inserted in the working eccentric member and a bore disposed in the faceplate, wherein the locking device fixes the position of the working eccentric member relative to the faceplate after the initial installation and the retention pin interlocks with the bore disposed in the faceplate.

6. The tensioner of claim 1, and further comprising a sliding bearing inserted between the support body and the working eccentric member and having on one end a circumferential collar formed as a single piece, and a locking washer affixed to the support body, wherein the circumferential collar, which in the installed position is arranged between the working eccentric member and the locking washer, forms the at least one damping device and functions as a friction disk.

7. The tensioner of claim 1, and further comprising a locking washer affixed to the support body, and a friction disk forming the at least one damping device, the friction disk being inserted between the working eccentric member and the locking washer.

8. The tensioner of claim 1, and further comprising a friction element inserted between the working eccentric member and the faceplate and forming the at least one damping device.

9. The tensioner of claim 8, and further comprising a helical compression spring, wherein the friction element is disposed in an annular gap which is bounded radially by the support body and a stepped interior wall of the working eccentric member, and the helical compression spring supports the friction element on the faceplate through a force-transmitting connection.

10. The tensioner of claim 8, and further comprising a rotation inhibiting element disposed between the working eccentric member and the friction element.

11. The tensioner of claim 1, and further comprising a guide disk that is non-rotatably supported on the faceplate and has an inclined face, wherein a first spring end of the torsion spring is connected to the working eccentric member and a second spring end of the torsion spring is connected to the inclined face of the guide disk.

12. The tensioner of claim 11, wherein the guide disk has an axially oriented sleeve portion guiding an end section of the torsion spring, and at least one centering flash which is oriented in an axial direction opposite to the sleeve portion and engages form-fittingly in a bore disposed in the faceplate.

13. A method for mounting a tensioner for a traction member of a traction drive for use with an internal combustion engine, the tensioner comprising:
a faceplate which includes a centering shoulder and an oblong hole and is connected as a single piece with a support body;
a bolt fastener guided through a center bore of the support body and securing the tensioner stationarily on a machine part;
a working eccentric member supported in encompassing disposition on the support body for limited rotation on the support body and concentrically surrounded by a tensioning roller supported by a roller bearing, said roller bearing encompassing the support body;
at least one damping device disposed between a non-rotatable component of the tensioner and the working eccentric member;
a locking device and a catch disposed between the working eccentric member and the faceplate;
wherein the method comprises a pre-installation phase which includes: securing the support body on the faceplate;
pretensioning the torsion spring by pushing the working eccentric member, including the tensioning roller, the roller bearing and the locking device axially onto the support body;
securing a locking washer on the support body for axially supporting the working eccentric member;
rotating the working eccentric member into a pre-installation position which is fixed by a retention pin connecting the working eccentric member and the faceplate;
and the method further comprising a final assembly phase which includes:
attaching the faceplate with a flange connection, wherein the centering shoulder of the faceplate fits form-fittingly in a recess of the machine part;
securing the tensioner with the bolt fastener on the machine part; and
releasing the retention pin, thereby causing the torsion spring to automatically rotate the working eccentric member, whereby the catch disposed between the working eccentric member and the faceplate is activated during and synchronous with the rotation of the working eccentric member, said catch limiting a rotation range of the working eccentric member.

* * * * *